UNITED STATES PATENT OFFICE.

R. BERKELEY FITTS, OF PHILADELPHIA, PENNSYLVANIA.

IMPROVEMENT IN PREPARING WHEAT, CORN, AND OTHER GRAINS FOR FOOD.

Specification forming part of Letters Patent No. 117,165, dated July 18, 1871.

*To all whom it may concern:*

Be it known that I, R. BERKELEY FITTS, of the city and county of Philadelphia and State of Pennsylvania, have, as I believe, invented a new and useful Improvement in Preparing Wheat, Corn, and other Grain for Food; and I do hereby declare the following to be a full and exact description of the same.

The object of my invention is to treat wheat, corn, and other grain with a view of destroying and removing any impurities they may have acquired, or want of sound condition, and also to cook the glutinous and starchy properties of the grain and render the whole friable, so that it may be reduced to any grade of fineness desired, and thus retain the phosphatic or bone and muscle and brain-feeding elements, as well as other portions, bringing all its properties into a condition for easy digestion and ready and more perfect assimilation by the functions of the human system. My invention consists in subjecting the grain first to the action of very hot and boiling water, and following this with a drying heat and continuing the same until the grain is in suitable condition for the mill or to be put into packages for the market.

By this mode of hot and boiling-water treatment, the grain, being in a wire-cloth vessel, is immersed into hot or boiling water in a suitable vessel, where it should remain from five to fifteen minutes according to the condition of the grain and the water being agitated so all the grains shall be acted upon by the water. Five minutes' time, if the water is at or near boiling-point, will be sufficient to remove musty odor and other impurities, and, as my object is also to cook the grain, twenty, or even thirty minutes' time may not be too long with the water briskly boiling.

The drying may be by the direct application of superheated steam, or any suitable means, to bring the grain to a thoroughly desiccated or crisp condition and well fitted for the mill or for the market. Wheat and corn thus treated may be made into grits, or cracked and prepared for the table in the ordinary manner, only requiring much less time in cooking, or, on being ground into meal or fine flour for many uses, possessing great superiority as proper food for the human system and presenting itself as a more palatable and economical diet.

Other very important features of my invention are the purification and sweetening of grain, and improving its keeping in transportation in summer and in warm climates, and restoring it to its original best and sound condition when injured by dampness in transportation or storage.

The product of this treatment I put into sacks or any packages for the mill or market. The cracked grain, or that ground into meal or fine flour, I put up into packages for the convenience of the consumer and the dealers.

What I claim as my invention, and desire to secure by Letters Patent, is—

1. The within-described treatment of grain to the purifying and cooking by hot water, followed by dry heat for the purposes specified.

2. The product of the above-described treatment as a new article of commerce.

In testimony whereof I have signed my name to this specification in the presence of two subscribing witnesses.

R. BERKELEY FITTS.

Witnesses:
    EDM. F. BROWN,
    DANIEL BREED.